United States Patent [19]

Boushek, Jr. et al.

[11] 4,324,552
[45] Apr. 13, 1982

[54] BELT DRIVE SYSTEM WITH CLUTCH

[75] Inventors: Sidney J. Boushek, Jr., Ottumwa; Travis B. Unterzuber, Agency, both of Iowa

[73] Assignee: Deere & Company, Moline, Ill.

[21] Appl. No.: 130,271

[22] Filed: Mar. 14, 1980

[51] Int. Cl.³ .......................... F16H 7/00; F16H 7/12; F16H 7/14
[52] U.S. Cl. .................................. 474/118; 474/133; 474/115; 474/135
[58] Field of Search ............... 474/118, 133, 139, 117, 474/135, 136, 138, 115; 56/11.6; 74/470, 526; 192/11, 48.1, 48.7, 99 B

[56] References Cited

U.S. PATENT DOCUMENTS

| | | | |
|---|---|---|---|
| 1,078,402 | 11/1913 | Alterfer | 474/118 |
| 1,869,072 | 7/1932 | McVicker | 474/118 |
| 2,133,512 | 10/1938 | Herge | 56/11.6 |
| 4,128,017 | 12/1978 | Clarke | |

FOREIGN PATENT DOCUMENTS 612083  6/1960  Fed. Rep. of Germany .

Primary Examiner—C. J. Husar
Assistant Examiner—Lawrence J. Gotts

[57] ABSTRACT

A belt drive system comprising a drive sheave, a driven sheave, a belt providing driving engagement between said sheaves and a clutch for engaging and disengaging said driving engagement. The clutch is engaged and disengaged by moving an idler pulley assembly toward and away from the belt and by moving the driven sheave away from and toward the drive sheave. The clutch further includes an actuator member for providing simultaneous coordinated movement of the idler pulley assembly and driven sheave for engagement and disengagement of the clutch.

7 Claims, 4 Drawing Figures (CLUTCH ENGAGED)

(CLUTCH DISENGAGED)

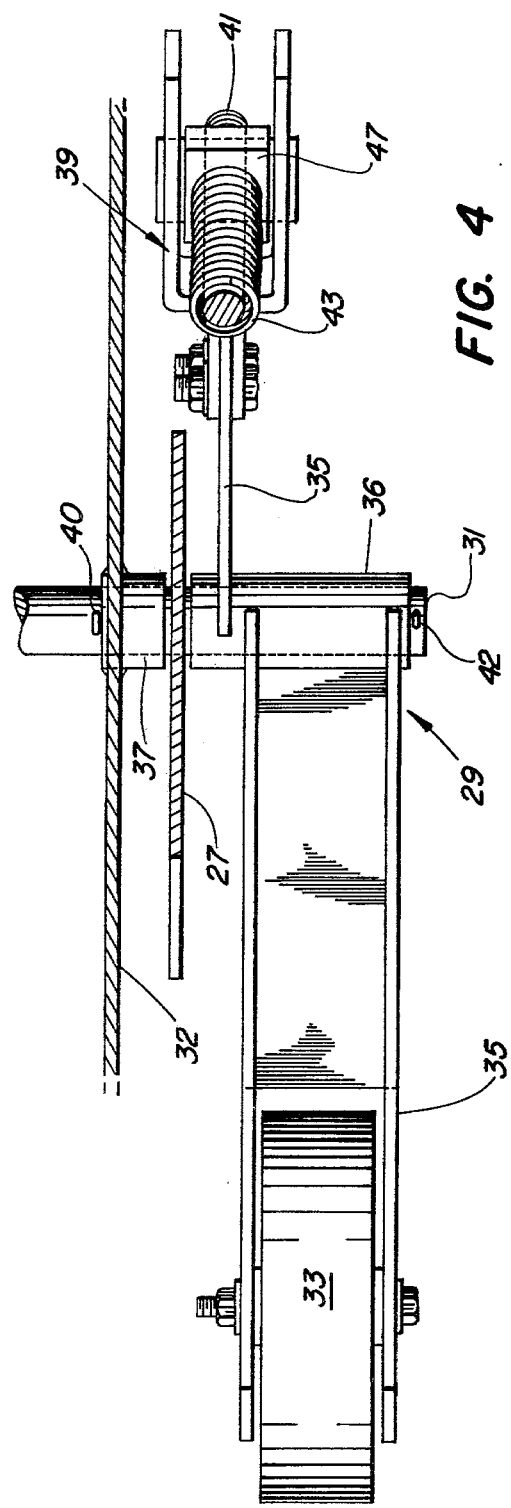

BELT DRIVE SYSTEM WITH CLUTCH

BACKGROUND OF THE INVENTION

This invention relates to belt drive systems and more particularly to such drive systems with a clutch for engaging and disengaging the drive engagement between the sheaves of the system. While such drive systems have a variety of applications, one application where the invention provides particular utility is in a mobile agricultural implement where an engagement and disengagement of the clutch is remotely controlled from the operator's station of the mobile implement.

One example of such an application is in self-propelled agricultural implements to transmit power from the engine of the self-propelled implement to the implement tools. For example, in a self-propelled windrower, such tools are a cutter for severing the crop from the field, conditioning rolls for conditioning the crop, and a reel for moving the crop from the cutter into the conditioning rows.

In the prior art such belt drives are commonly provided with a clutch so that the driving of the implement tools may be stopped independently of the engine of the self-propelled implement. There are two basic prior art methods for providing a clutch for belt drives, in general and also in common use, for such belt drives in self-propelled implements. One is the use of a movable idler pulley for slackening and tensioning the belt of the drive system. The second is the use of a movable drive sheave as one sheave of the belt drive so that the belt may be slackened and tensioned by movement of the sheave. When the drive system has a relatively short center-to-center distance between the drive sheaves of the system, there is often not enough room for a movable idler pulley to take up a sufficient amount of belt slack to permit adequate engagement and disengagement of the driving engagement between the sheaves. This problem is overcome typically by using the second of the two clutch types (i.e., movably mounting one of the drive and driven sheaves of the system and using it to provide a clutching action rather than using a movable idler pulley). This type of clutch will take up more belt slack than an idler with the same amount of motion.

The use of only a movable sheave (either drive or driven sheave of system) introduces two major problems. First, in a two-sheave drive, the total belt tension needed (tight plus slack side), whether at rest or in motion, must equal the total tension needed to transmit the peak power that is required. As a result, the bearings and drive belt must carry the same high tensile load regardless of the power required to be transmitted at any given time. When a movable, spring-loaded idler pulley is used as the clutch, the total tension required in the belt varies with the instantaneous power required. The idler maintains the tension constant in the slack side of the belt. The tension in the tight side of the belt varies from the minimum static tight side tension with the power required to be transmitted instantaneously such that the total tension in the belt (tight side plus slack side) equals the total tension required to transmit the instantaneous power required. Secondly, a two-sheave drive is limited to 360° belt wrap. If an idler sheave is used, the belt wrap can be increased and therefore permit the transmission of higher power requirements with no increase in tension in the belt (relative to the two-sheave system).

Accordingly, it is an object of this invention to overcome the disadvantages of both clutch types by providing a belt drive system (including a clutch) which uses both a movable drive sheave clutching action and a movable, spring-loaded idler sheave clutching action.

Another object of this invention is to provide for a belt drive system having a very short center-to-center distance between the sheaves of the drive system and a clutch which permits sufficient belt length to be taken up and released to provide a clutching action.

Still another object of the invention is to provide a belt drive system wherein the total belt tension varies as a function of the instantaneous power.

Still another object of the invention is to provide a belt drive system having a short center-to-center distance between the drive and driven sheaves with improved drive component life.

Still another object of the invention is to provide a belt drive system having a short center-to-center distance between the drive and driven sheaves with more than a 360° belt wrap on the drive and driven sheaves.

BRIEF DESCRIPTION OF THE INVENTION

These and other objects of the invention are accomplished by a belt drive system comprised of a drive sheave, a driven sheave, a belt entrained about said sheaves for providing driving engagement therebetween and a clutch means for engaging and disengaging the drive engagement between said sheaves. The clutch means includes an idler assembly and operates (1) by moving the idler assembly toward and away from said belt, and (2) by moving the second sheave away from and toward the first sheave. In a preferred embodiment, an actuated member is provided for simultaneously controlling and coordinating the movement of the position of the driven sheave relative to the drive sheave and the position of the idler assembly relative to the belt. Still another feature of the invention is a bias member for interconnecting an idler arm of the idler assembly and the actuator member. The bias member enables the simultaneous movement of the idler arm and the actuator member, permits movement of the idler arm relative to the actuator member and provides proper tensioning of the idler pulley of the assembly against the belt.

In accordance with still another feature of the invention, an over-center control linkage is provided for interconnecting a manual clutch control in the operator's station of a mobile implement enabling the remote control of the engagement and disengagement of the clutch by an operator.

BRIEF DESCRIPTION OF THE DRAWINGS

FIG. 4 is a cross-sectional view of FIG. 2 taken along lines 4—4.

DESCRIPTION OF THE PREFERRED EMBODIMENT

Figure 1:
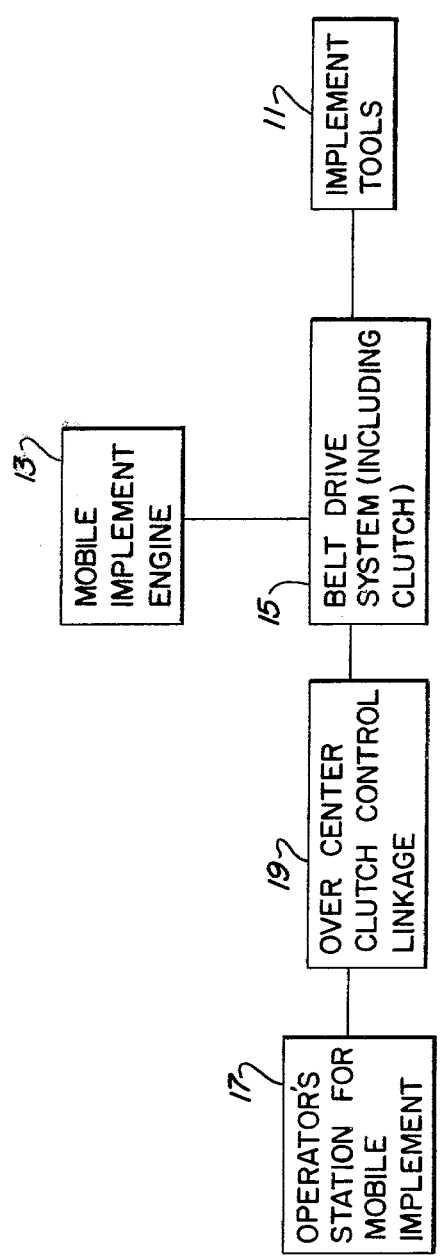
FIG. 1 is a block diagram of a mobile implement with a belt drive system (including clutch) in accordance with the features of this invention.
Figure 2:
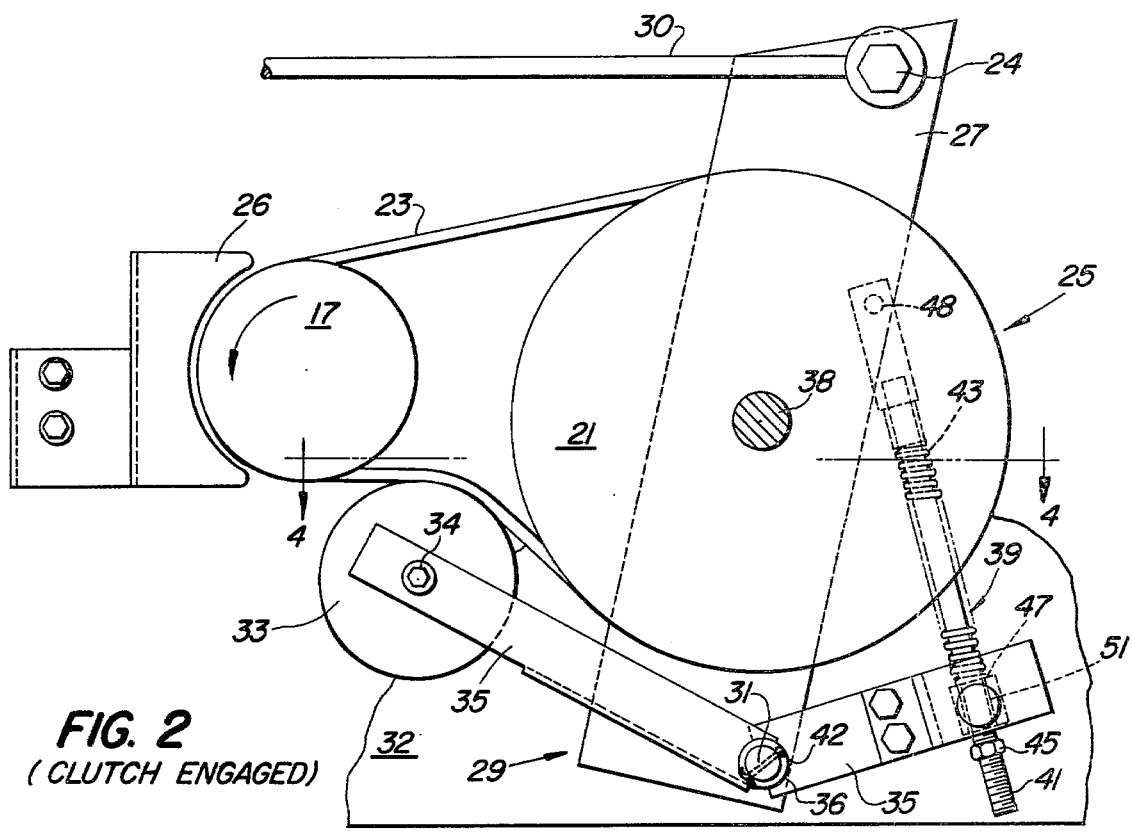
FIG. 2 is a side elevational view of a belt drive system in accordance with the features of this invention with the clutch engaged.
Figure 3:
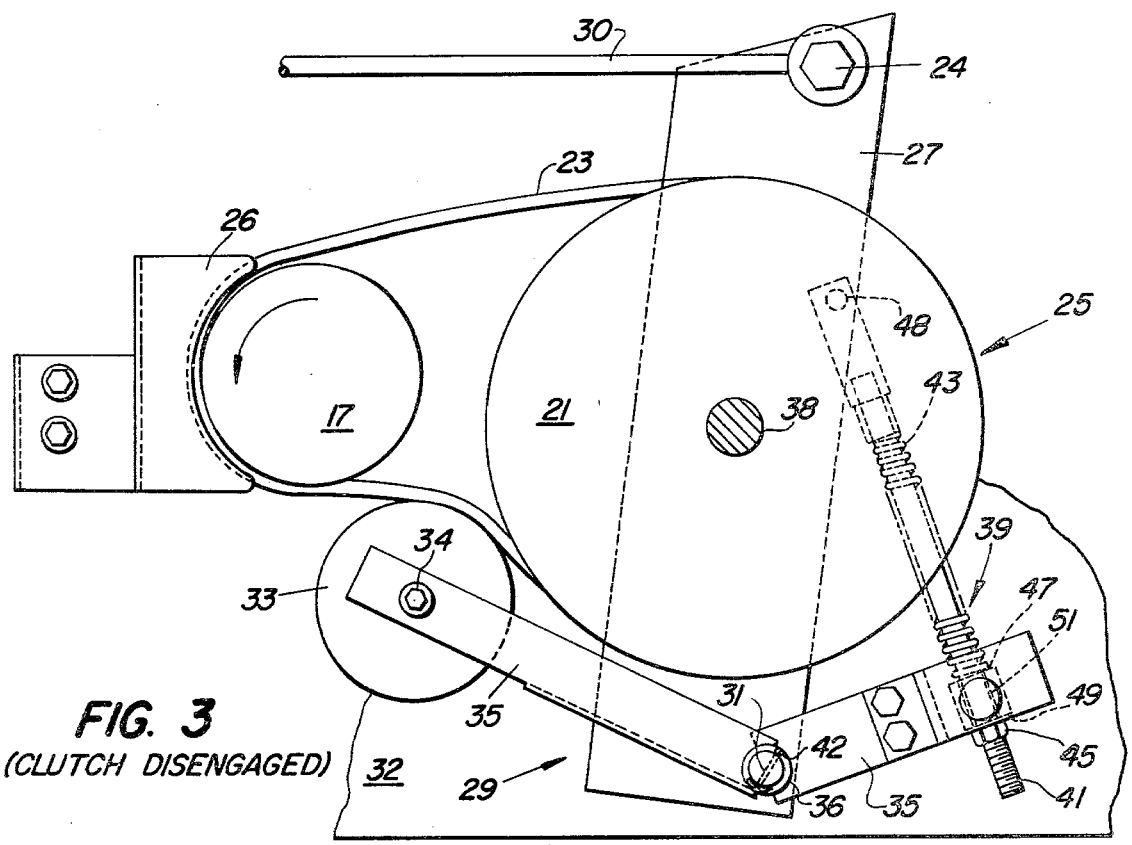
FIG. 3 is a side elevation view of the belt drive system of FIG. 2 with the clutch disengaged.

FIG. 1 illustrates in block diagrammatic form a preferred embodiment for implementing the features of this invention in a mobile implement such as, for example, a self-propelled windrower. As is well known in such implements, implement tools 11, such as the tools for cutting, conditioning and windrowing of crop material, are driven by an implement engine 13 (for propelling the implement) through a belt drive system 15. The driving of implement tools 11 is selectively controlled by the operator from the operator's station 17 for the mobile implement via a clutch control provided in the operator's station 17 which is interconnected with the belt drive system 15 with a conventional overcenter clutch control linkage 19. Implement tools 11 are selectively driven by engagement and disengagement of a clutch included within the belt drive system 15. The belt drive system 15 is illustrated in more detail in FIGS. 2–4. FIG. 2 illustrates the drive system 15 with the clutch engaged. FIG. 3 illustrates the drive system 15 with the clutch disengaged.

Belt drive system 15 is comprised of a first or drive sheave 17 mounted on and rotatable with the crankshaft (not shown) of engine 13, a second or driven sheave 21, a belt 23 entrained around sheaves 17, 21 for providing a driving engagement therebetween and a clutch means 25. A belt guide 26 is provided adjacent drive sheave 17 to maintain belt 23 aligned with sheave 17 when clutch 25 is disengaged (FIG. 3). Guide 26 is bolted to a support (not shown).

Clutch means 25 engages and disengages the driving engagement between sheaves 17, 21. Clutch means 25 is comprised of an actuator member 27 and an idler pulley assembly 29. Actuator member 27 includes an integral shaft 31 which is rotatably mounted in bushings 36, 37 (FIG. 4) by a pair of cotter pins 40, 42. Bushing 37 is fixed to a support 32 which provides support for the weight of clutch means 25 and sheave 21. Sheave 21 is mounted for rotational movement on actuator member 27 by a shaft 38 and together with actuator member 27, is movable toward and away from drive sheave 17 by a pivotal movement about the longitudinal axis of shaft 31. A control arm 30 is interconnected between over-center linkage 19 (FIG. 1) and actuator member 27 and enables movement of actuator member 27 between the clutch engaged and disengaged positions shown in FIGS. 2, 3 respectively remotely from station 17. Arm 30 is pivotably connected to actuator member 27 via a bolt 24. The movement of driven sheave 21 toward and away from drive sheave 17 provides part of the clutching action by slackening and tensioning belt 23 as shown in FIGS. 2, 3.

Idler pulley assembly 29 also functions as an integral part of clutch 25 and is comprised of an idler pulley 33, an idler arm 35 pivotally mounted on shaft 31, and a bias member 39 for biasing idler arm 35 and idler pulley 33 toward and away from the slack side of belt 23 with pivotal movement of actuator member 27 about the longitudinal axis of shaft 31. Idler arm 35 is fixed, for example, by welding to bushing 36 pivotally mounted coaxially on shaft 31. At one end of arm 35, idler pulley 33 is rotatably mounted by a pivot 34 and at the other end of arm 35, interconnection with bias member 39 is made.

Bias member 39 is interconnected between actuator member 27 and idler assembly 29 to control the bias of idler assembly 29 toward and away from belt 23. Bias member 39 is comprised of a central rod 41, a compression spring 43 mounted coaxially of rod 41, and a stop 45. At one end, bias member is pivotally mounted to actuator member 27 by a pivot 48, and at the other end, bias member 39 is slidably mounted through an opening 51 in the lower portion of arm 35. The position of idler arm 35 is determined by compression spring 43 which abuts arm 35 at a lower surface 47 of arm 35 and by stop 45 which is engageable with a surface 49 of arm 35.

In operation, it will be appreciated that the driving engagement between drive sheave 17 and driven sheave 21 in belt drive system 15 is controlled through engagement and disengagement of clutch means 25. Clutch means 25 provides engagement and disengagement of said driving engagement between said sheaves 17 and 21 by moving idler pulley 33 of idler assembly 29 toward and away from belt 23 and by moving driven sheave 21 away from and toward drive sheave 17 by shifting over-center linkage 19 from station 17. Driven sheave 21 is rotatably mounted on actuator member 27 and is together movable therewith by control arm 30 for pivotal movement about the axis of shaft 31 between a clutch-engaged position shown in FIG. 2 and a clutch-disengaged position shown in FIG. 3. Because of the interconnection of sheave 21 with idler assembly 29 through actuator member 27, movement of sheave 21 and idler assembly 29 is simultaneous and coordinated.

Idler arm 35 is pivotally mounted on shaft 31 of actuator member 25 and is also connected to actuator member 27 by bias member 39. When the drive system is changed from the clutch-disengaged position (FIG. 3) to the clutch-engaged position (FIG. 2), idler pulley 33 and idler arm 35 rotate with driven sheave 21 and actuator member 27 in clockwise movement about the axis of actuator member shaft 31 until the slack in belt 23 is almost taken up. At this point, actuator member 27 continues to rotate clockwise about the axis of shaft 31 a short distance to provide the desired belt tension while idler arm 35 and idler pulley 33 are essentially stationary. The movement of actuator member 27 relative to idler arm 35 causes rod 41 to slide longitudinally through opening 51 compressing spring 43 against surface 47 to the position shown in FIG. 2. The geometry of idler arm 35 and the spring force of spring 43 place the desired torque on arm 35 to tension the slack side of belt 23 properly. Belt drive system 15 is maintained in a clutch-engaged position through over-center linkage 15 connected to control arm 30.

The clutch may be changed from its engaged position (FIG. 2) to its disengaged position (FIG. 3) by reversing the movements just described. That is, the over-center linkage 19 is shifted manually from operator's station 17 from its clutch-engaged position to its clutch-disengaged position which moves control arm 30 longitudinally (to the left in FIG. 2) to shift actuator member 27 counterclockwise about the axis of shaft 31. This, in turn, moves driven sheave 21 toward drive sheave 17. Bias member 39 is moved with actuator member 27 for counterclockwise rotation about the axis of sheave 21 which partially relieves the tension of compression spring 43 on surface 47 of arm 35 until arm 35 engages stop 45. Thereafter, arm 35 moves in a counterclockwise direction about shaft 31, resulting in the movement of idler pulley 33 away from belt 23. By movement of driven sheave 21 toward drive sheave 17 and the movement of idler pulley 33 away from belt 23, belt 23 is in a slackened condition shown in FIG. 3 and is maintained in such position until operation of the clutch control linkage 19 from the operator's station 17.

It will be seen that the drive system, in accordance with the features of this invention, provides the advantages of both a movable driven sheave clutch and a spring-loaded, movable idler pulley clutch. Because a movable driven sheave is used as part of the clutching action, enough belt length can be taken up to allow a clutching action with a very short center distance between the drive and driven sheaves 17, 21. Also, because a slack side idler is used, the tension in the belt and the loading on the drive system components vary with the instantaneous power required by the implement tools rather than remaining at the peak belt tension that would be needed if only a movable driven sheave-type clutch were used. This results in longer drive system component life. Furthermore, the use of an idler pulley assembly increases belt wrap around the drive and driven sheaves 17, 21 compared to a two-sheave drive system, thereby allowing more power to be transmitted with the same belt tension.

It will be appreciated by those skilled in the art that the invention has been explained in connection with a preferred embodiment thereof as would be used in a mobile agricultural implement and that there are a wide variety of applications and design variations of the invention. Accordingly it is intended that the appended claims cover all such variations and applications as are within the true spirit and scope of the invention.

What is claimed is:

1. In a belt drive system comprising
(a) a support;
(b) a first sheave rotatably mounted relative to said support;
(c) a second sheave rotatably mounted relative to said support;
(d) a belt entrained around said sheaves for providing driving engagement between said sheaves;
(e) an idler assembly including an idler pulley and a bias member for biasing said pulley toward and away from said belt; and
(f) an actuator member pivotally mounted relative to said support and having said second sheave rotatably mounted thereon, said actuator member and said second sheave movable together toward and away from said first sheave for slackening and tensioning said belt, respectively; wherein the improvement comprises said bias member connected to said actuator member for biasing said idler pulley toward and away from said belt when said actuator member and said second sheave are moved away from and toward said first pulley, respectively.

2. The system of claim 1 further comprising a drive means for driving said first sheave and wherein said second sheave is drivable by said first sheave when said actuator member is moved away from said first sheave to tension said belt and when said idler pulley is moved toward said belt to engage the slack side of said belt.

3. The system of claim 1 wherein:
said bias member comprises a rod, a stop on said rod, and a compression spring mounted coaxially of said rod and between the connection of said bias member to said actuator and said stop; and
said idler assembly further comprises an idler arm pivotably mounted relative to said support, said idler pulley rotatably mounted on said arm, and said arm slidably mounted on said rod between said spring and said stop.

4. In a belt drive system comprising:
(a) a support;
(b) a first sheave rotatably mounted relative to said support;
(c) a second sheave rotatably mounted relative to said support and movably mounted toward and away from said first sheave; and
(d) a belt entrained around said sheaves for providing a driving engagement between said sheaves; and
(e) a clutch means comprising: (1) actuator member pivotably mounted relative to said support for movement toward and away from said first sheave, said second sheave rotatably mounted on said member and (2) an idler assembly comprising an idler arm pivotably mounted relative to said support, and an idler pulley rotatably mounted to said idler arm and movable on said idler arm toward and away from said belt, said clutch means for engaging and disengaging said driving engagement between said sheaves (a) by moving said idler pulley toward and away from said belt and (b) by moving said second sheave away from and toward said first sheave; wherein the improvement comprises said clutch means further comprising a bias member interconnected between said actuator member and said idler arm for biasing said idler pulley toward and away from said belt when said actuator member and said second sheave are moved away from and toward said first sheave, respectively.

5. The system of claim 4 wherein:
said bias member comprises (1) a rod, (2) a compression spring mounted coaxially of said rod and (3) a stop fixed to said rod; and
said idler arm slidably mounted on said rod between one end of said spring and said stop.

6. The system of claims 5 or 3 wherein said actuator member and said idler arm are pivotably mounted relative to said support about the same axis of rotation.

7. The system of claims 5 or 4 further comprising a drive means for driving said first sheave, and wherein said second sheave is drivable by said first sheave when said clutch means is engaged, and said idler pulley is engaged with the slack side of said belt.

* * * * *